United States Patent
Brown et al.

(10) Patent No.: US 9,992,055 B2
(45) Date of Patent: Jun. 5, 2018

(54) DISSEMINATING COMMANDS FROM A DMS SERVER TO FIELDED DEVICES USING AN EXTENDABLE COMMAND ARCHITECTURE

(75) Inventors: John R. Brown, Boynton Beach, FL (US); Robert M. Dare, Sunrise, FL (US)

(73) Assignee: OpenPeak LLC, Plano, TX (US)

(*) Notice: Subject to any disclaimer, the term of this patent is extended or adjusted under 35 U.S.C. 154(b) by 1187 days.

(21) Appl. No.: 12/983,120

(22) Filed: Dec. 31, 2010

(65) Prior Publication Data

US 2012/0173687 A1     Jul. 5, 2012

(51) Int. Cl.
   *G06F 15/173*     (2006.01)
   *H04L 12/24*      (2006.01)

(52) U.S. Cl.
   CPC ........ *H04L 41/0266* (2013.01); *H04L 41/046* (2013.01)

(58) Field of Classification Search
   CPC ........................... H04L 41/0266; H04L 41/046
   USPC ................ 709/223, 217, 241; 370/401, 338; 717/100
   See application file for complete search history.

(56) References Cited

U.S. PATENT DOCUMENTS

| | | | |
|---|---|---|---|
| 6,785,255 B2* | 8/2004 | Sastri et al. | 370/338 |
| 7,620,001 B2 | 11/2009 | Ganji | |
| 2002/0147841 A1* | 10/2002 | Lee | 709/241 |
| 2003/0130984 A1 | 7/2003 | Quinlan et al. | |
| 2004/0088369 A1* | 5/2004 | Yeager et al. | 709/217 |
| 2004/0098449 A1 | 5/2004 | Bar-Lavi et al. | |
| 2005/0039159 A1* | 2/2005 | Pan et al. | 717/100 |
| 2006/0075077 A1 | 4/2006 | Brookner | |
| 2007/0156870 A1 | 7/2007 | McCollum | |
| 2007/0294380 A1 | 12/2007 | Natarajan et al. | |
| 2008/0098160 A1 | 4/2008 | Slyz et al. | |
| 2009/0122802 A1* | 5/2009 | Moussa et al. | 370/401 |
| 2009/0288079 A1 | 11/2009 | Zuber et al. | |
| 2010/0077035 A1 | 3/2010 | Li et al. | |
| 2010/0281474 A1 | 11/2010 | Eason et al. | |
| 2012/0173687 A1* | 7/2012 | Brown et al. | 709/223 |

FOREIGN PATENT DOCUMENTS

WO     2011150234 A1     12/2011

OTHER PUBLICATIONS

International Search Report and Written Opinion for Int'l Application No. PCT/US2011/038184, mailed on Aug. 26, 2011, 13 pages.
International Search Report and Written Opinion for International Application No. PCT/US2011/068038, mailed on Aug. 31, 2012, 9 pages.

* cited by examiner

*Primary Examiner* — Thuong Nguyen

(57) ABSTRACT

A method of remotely managing a fielded device with a device management system (DMS). Via a processor, a DMS directive can be received on the fielded device. The DMS directive can include at least one system command for a DMS agent instantiated on the fielded device and intelligence information not previously stored on the fielded device that is necessary for the DMS agent to interpret the system command. Via the processor the DMS agent can be executed to process the system command using the intelligence information provided in the DMS directive to implement the system command without requiring an update to computer-readable program code that defines the DMS agent.

24 Claims, 5 Drawing Sheets

400

| Generate a DMS directive for a fielded device, the DMS directive comprising at least one system command for a DMS agent instantiated on the fielded device and intelligence information not previously stored on the fielded device that is necessary for the DMS agent to interpret the system command 402 |

| Communicate the DMS directive to the fielded device 404 |

500

```
Receive a DMS directive on a fielded device, the DMS directive
comprising at least one system command for a DMS agent
instantiated on the fielded device and intelligence information not
previously stored on the fielded device that is necessary for the
DMS agent to interpret the system command
                                                              502
```

↓

```
Execute the DMS agent to process the system command using the
intelligence information provided in the DMS directive to
implement the system command without requiring an update to
computer-readable program code that defines the DMS agent
                                                              504
```

↓

Is the intelligence information persistent data? 506 — Yes →

↓ No

Delete the intelligence information from the fielded device 508

↓

End 510

FIG. 5

DISSEMINATING COMMANDS FROM A DMS SERVER TO FIELDED DEVICES USING AN EXTENDABLE COMMAND ARCHITECTURE

BACKGROUND

Field of Technology

The present description generally relates to device management systems (DMS) and, more particularly, to providing remote management of fielded devices managed by DMS systems.

Background

A Device Management System (DMS) is comprised of connectivity methods and detailed communication protocols used to provide for the remote management of fielded devices. Examples of fielded devices are web-enabled embedded devices. Specific capabilities of the management system are largely dependent upon the set of commands or directives understood by a DMS agent instantiated on a fielded device in a client-server architecture. In this client-server architecture, a DMS server typically is used to control operational procedures adopted by an organization and disseminate the appropriate instructions to the fielded devices, while keeping within the scope of management supported by the system.

A fielded device typically includes a DMS agent on the device, which typically is used to receive the directives from a DMS server and update a managed device. The commands understood by the DMS agent tether the DMS system. In some instances, DMS agents may not understand the targeted commands for a given management level. In such cases, new DMS agent software needs to be deployed to update the DMS agents for the managed devices. Deploying new DMS agent software, however, has significant associated risk. For example, if an event occurs that causes a data communication error or loss of communication during the DMS agent update, a fielded device may be rendered unreachable or unusable.

SUMMARY

The present description relates to a method of remotely managing a fielded device with a device management system (DMS). The method includes, via a processor, receiving a DMS directive on the fielded device. The DMS directive can include at least one system command for a DMS agent instantiated on the fielded device and intelligence information not previously stored on the fielded device that is necessary for the DMS agent to interpret the system command. The method also includes, via the processor, executing the DMS agent to process the system command using the intelligence information provided in the DMS directive to implement the system command without requiring an update to computer-readable program code that defines the DMS agent.

The intelligence information can include a loadable library, an extensible markup language (XML) document and/or encoded binary data. The intelligence information also can include a daemon that is instantiated on the fielded device when the DMS agent is executed to process the system command.

The intelligence information can be received by the fielded device as a payload contained in a message in which the DMS directive is communicated. The intelligence information can be deleted from the fielded device after processing of the system command is completed.

Another embodiment can include a method of remotely managing a fielded device with a DMS. The method can include, via a processor, generating a DMS directive for the fielded device. The DMS directive can include at least one system command for a DMS agent instantiated on the fielded device and intelligence information not previously stored on the fielded device that is necessary for the DMS agent to interpret the system command. The method also can include, via the processor, communicating the DMS directive to the fielded device.

The intelligence information can be communicated as a payload contained in a message in which the DMS directive is communicated. The system command can include an instruction to delete from the fielded device the intelligence information after processing of the system command is completed.

Another embodiment also relates to a fielded device remotely managed by a DMS. The fielded device can include a processor configured to receive a DMS directive on the fielded device. The DMS directive can include at least one system command for a DMS agent instantiated on the fielded device and intelligence information not previously stored on the fielded device that is necessary for the DMS agent to interpret the system command. The processor also can be configured to execute the DMS agent to process the system command using the intelligence information provided in the DMS directive to implement the system command without requiring an update to computer-readable program code that defines the DMS agent.

The intelligence information can include a daemon that is instantiated on the fielded device when the DMS agent is executed to process the system command. The intelligence information can be received by the communication device as a payload contained in a message in which the DMS directive is communicated. The processor can delete from the fielded device the intelligence information after processing of the system command is completed.

Another embodiment relates to a DMS server that remotely manages a fielded device. The DMS server can include a processor configured to generate a DMS directive for the fielded device. The DMS directive can include at least one system command for a DMS agent instantiated on the fielded device and intelligence information not previously stored on the fielded device that is necessary for the DMS agent to interpret the system command. The processor further can communicate the DMS directive to the fielded device.

The DMS server can communicate the intelligence information as a payload contained in a message in which the DMS directive is communicated. The system command can include an instruction to delete from the fielded device the intelligence information after processing of the system command is completed.

BRIEF DESCRIPTION OF THE DRAWINGS

Embodiments will be described below in more detail, with reference to the accompanying drawings, in which:

FIG. 5 is a flowchart presenting another method of remotely managing a fielded device with a DMS that is useful for understanding the present description.

DETAILED DESCRIPTION

While the specification concludes with claims defining features that are regarded as novel, it is believed that the claims will be better understood from a consideration of the description in conjunction with the drawings. As required, detailed embodiments are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ virtually any appropriately detailed structure. Further, the terms and phrases used herein are not intended to be limiting but rather to provide an understandable description.

Arrangements described herein relate to remote management of fielded devices in a device management system (DMS). These arrangements provide an architecture for disseminating commands from a DMS server to fielded devices using an extendable command architecture. As used herein, the term "extendable command architecture" means an architecture in which commands not previously known to a DMS agent may be communicated to a fielded device on which the DMS agent is instantiated, along with intelligence information that is processed by the DMS agent to properly interpret the commands. Using the extendable command architecture, the need to update and/or replace DMS agents in order to process new directives is eliminated, thereby virtually eliminating the risk of the fielded device becoming unreachable or unusable due to a data communication error or loss of communication during the DMS agent update.

Figure 1:
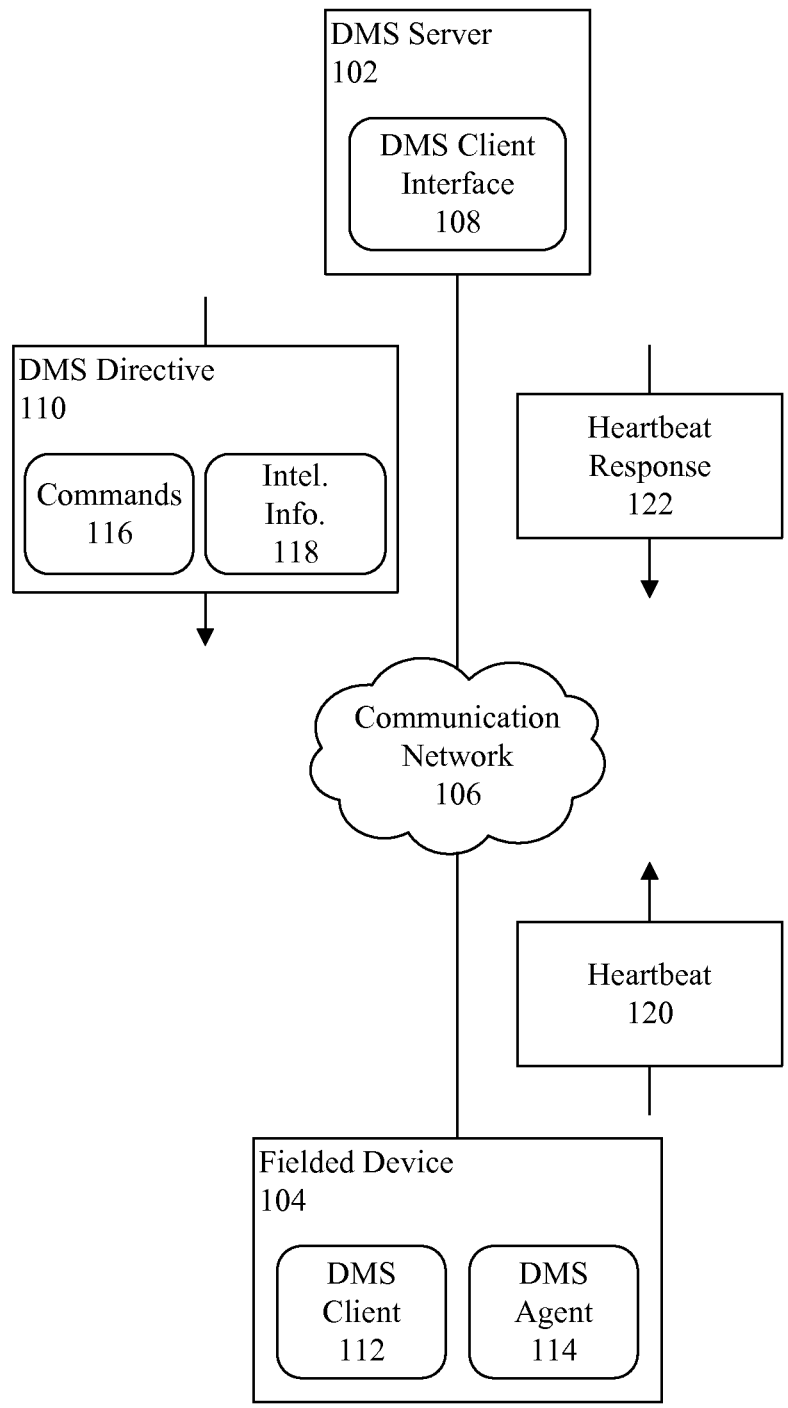
FIG. 1 depicts a device management system (DMS) system that is useful for understanding the present description.

FIG. 1 depicts a DMS system 100 that is useful for understanding the present description. The DMS 100 can include at least one DMS server 102 and at least one fielded device 104 communicatively linked via a communication network 106. The communication network 106 can comprise the Internet, a wide area network (WAN), a local area network (LAN), a wireless communication network, and/or the like. In this regard, the communication system 106 can include wired communication links and/or wireless communication links.

The DMS server 102 can be a computer that includes a processor, memory, a computer-readable storage medium, a network adapter, and other components known to those skilled in the art. A DMS client interface 108 can be stored on the computer-readable storage medium, or stored to a data storage device that is communicatively linked to the DMS server 102. The DMS client interface 108 can interface with the fielded device 104, as well as other fielded devices. For example, the DMS client interface 108 can include a message publisher interface that communicates DMS directives 110 to fielded devices 104 and that facilitate a heartbeat service. The interactions between the DMS client interface 108 and the fielded device 104 will be described herein in greater detail.

The fielded device 104 can be any device that subscribes to the DMS system 100 and that may be communicatively linked to the DMS server 102, for example via the communication network 106, to receive one or more DMS directives 110 from the DMS client interface 108. As used herein, the term "DMS directive" means a message communicated to a DMS client, wherein the message includes at least one command to be executed by a device on which the DMS client is instantiated.

Examples of fielded devices include, but are not limited to, embedded devices, mobile communication devices, and the like. Embedded devices may be embedded within other systems to control certain functions within those systems. Such systems can be appliances, tools, vehicles (e.g., automobiles, motorcycles, or the like), marine craft, aircraft, telephone systems, etc. Mobile communication devices can be mobile telephones, mobile computers (e.g., laptop computers, tablet computers, etc.), or any other mobile devices that may be communicatively linked to the DMS server 102.

The fielded device 104 can include a DMS client 112 and DMS agent 114 instantiated thereon. The DMS client 112 and DMS agent 114 can be implemented as computer-readable program code that, when executed by the processor, implement the various processes described herein. As used herein, the term "DMS client" means client-side software instantiated on a fielded device that establishes a communication link with a DMS server and, among other things, receives DMS directives 110 from the DMS server 102. As used herein, the term "DMS agent" means client-side software that is instantiated on a fielded device that implements the DMS directives 110 received from a DMS server 102. The DMS agent 114 can be implemented on the fielded device 104 as a component of the DMS client 112, or implemented on the fielded device 104 as a separate component with which the DMS client communicates. The term "fielded device," as used herein, means a device that may be remotely connected to a DMS server and which may receive DMS directives from a DMS server. The term "instantiate," as used herein, means to create an instance of a process, object or application.

When a DMS directive 110 is communicated from the DMS server 102 to the DMS client 112, the directive can be encapsulated with one or more commands 116 and intelligence information 118 not previously available to the DMS agent 114, but which is necessary for the DMS agent 114 to interpret the commands 116 contained in the DMS directive 110. In illustration, the commands 116 can be system level commands, though this need not be the case.

The DMS directive 110 can be communicated from the DMS server 102 to DMS client 112, which can provide the commands 116 to the DMS agent 114. The commands can identify the intelligence information 118 in a manner that indicates to the DMS agent 114 that the intelligence information must be processed to interpret the commands 116. When processing the commands, the DMS agent 114 can process the intelligence information 118 as appropriate.

As such, processing of the intelligence information by the DMS agent 114 can enable the DMS agent 114 to execute the commands 116, even if the commands 116 were not previously recognized or executable by the DMS agent 114. Accordingly, new commands 116 which were not previously considered when developing the DMS agent 114 can be provided for execution by the DMS agent 114 without requiring that the DMS agent 114 be updated to process the new commands 116. Moreover, because the DMS directive 110 includes the intelligence information 118 necessary to implement the commands 116, maintenance activity initiated on the server-side of the DMS system 100 can be performed on the fielded device 104 without requiring client-side user inputs to the fielded device 104. Thus, if the fielded device is an embedded device, a user of the system in which the embedded device is located need not participate in the maintenance. This arrangement can be especially beneficial if the fielded device 104 does not include a user interface, or has limited user interface functionality.

In an aspect, the intelligence information 118 can be communicated as a payload of the DMS directive 110. The term "intelligence information," as used herein, means data that may be processed by a DMS agent in order to interpret one or more commands contained in a DMS directive, or data that may be processed by a DMS agent when initiating one or more commands contained in a DMS directive.

The intelligence information can comprise a library loadable by the DMS agent 114, an extensible markup language (XML) document, encoded binary data, a vocabulary dictionary (e.g., a persistent or temporary data table), or any other information that may be processed by the DMS agent 114 to implement the commands 116. By way of example, the intelligence information can provide to the DMS agent 114 system level syntax necessary to execute system level commands. Such system level syntax need not be previously stored on the fielded device 104 prior to receiving the DMS directive 110.

In another arrangement, the intelligence information 118 can include a daemon. As used herein, the term "daemon" means a computer program that is not under the direct control of a user and is initiated as a background process on a fielded device. By way of example, the daemon can be instantiated on the fielded device 104 via a DMS agent command to allow remote access to the fielded device 104 by the server 102 or an authorized remote user (e.g., a person). In this regard, a DMS agent can initiate a command contained in a DMS directive to instantiate a daemon.

Examples of commands 116, or chains of commands 116, include those commands that may re-image a data storage medium on the fielded device 104, or portion thereof, re-partition the data storage medium, edit data streams, manipulate files or file systems (e.g., delete a file, edit a file, rename a file, etc.), manipulate processes executable by the fielded device 104, activate or deactivate DHCP on the fielded device 104, issue a new IP address to the fielded device 104, install, remove or update a kernel module on the fielded device 104, capture screen shots on the fielded device 104 and provide such screen shots to the DMS server 102 or an authorized user, and so on. Still, the present arrangements are not limited to these specific examples, and those skilled in the art will appreciate that a myriad of other commands or command chains can be implemented on the fielded device 104 in accordance with the processes described herein.

Suitable security measures can be implemented to ensure that only authorized entities may access the fielded device 104. For example, a secure transport certificate or HTTPS based security can be implemented. Still, many other forms of security can be implemented and the present arrangements are not limited in this regard.

The intelligence information 118 can be deleted from the fielded device 104 after the commands 116 have been executed by the DMS agent 114, though this need not be the case. In illustration, if the intelligence information 118 includes a daemon, the daemon can be deleted after a remote access session to the fielded device 104 has been completed. If the intelligence information 118 includes a vocabulary dictionary in the form of a data table, the data table can be removed after the commands 116 have been executed. Accordingly, unscrupulous users, such has hackers, can be prevented from accessing the daemon at a later time to establish a remote connection into the fielded device 104. In some instances, a re-start or re-boot of the fielded device 104 may be required to completely remove the intelligence information 118.

In other situations, it may be desirable to maintain the intelligence information 118 on the fielded device if it is anticipated that the intelligence may be beneficial to implement future commands, and the intelligence information is deemed to create a low security risk. For example, intelligence information 118 that provides a new vocabulary dictionary can be maintained on the fielded device 104 for future use. In this regard, the vocabulary dictionary can be embodied as a persistent table.

The DMS directive 110 can be communicated to the fielded device 104 in response to the DMS server 102 receiving a heartbeat 120 from the fielded device 104. In this regard, the DMS directive 110 can be requested by the DMS client 112 via the heartbeat 120, as opposed to being pushed by the DMS server 102 to the fielded device 104.

In illustration, the heartbeat service of the fielded device 104 can periodically communicate the heartbeat 120 to the DMS server 102 to indicate that the fielded device 104 is turned on and available to receive DMS directives 110, which may be available from the DMS server 102. In this regard, as used herein, the term "heartbeat" means a message communicated from a fielded device to a DMS server that indicates the availability of the fielded device to receive DMS directives. The fielded device 104 can be configured to communicate the heartbeat intervals defined by seconds, minutes, hours, days, weeks, a certain event, etc. Such intervals can be static, user configurable, or configurable via the update process.

When a heartbeat 120 is received from the fielded device 104, the DMS server 102 can communicate a heartbeat response 122. If no DMS directives 110 are presently available, the heartbeat response 122 can indicate such to the fielded device 104. If DMS directives 110 are presently available, the heartbeat response 122 can indicate that one or more DMS directives 110 will be communicated to the fielded device. For example, the heartbeat response 122 can indicate that the DMS directive 110 will be communicated to the fielded device in response to a next heartbeat 120, or at a particular time. In this regard, the heartbeat 120 and heartbeat response 122 can include data that facilitates coordination between the DMS server 102 and the fielded device 104 for delivery of the DMS directive 110. After the commands 116 in the DMS directive 110 have been executed, a next heartbeat 120 generated by the fielded device 104 can indicate to the DMS server 102 the status of the update, the status of the fielded device 104, etc.

Figure 2:
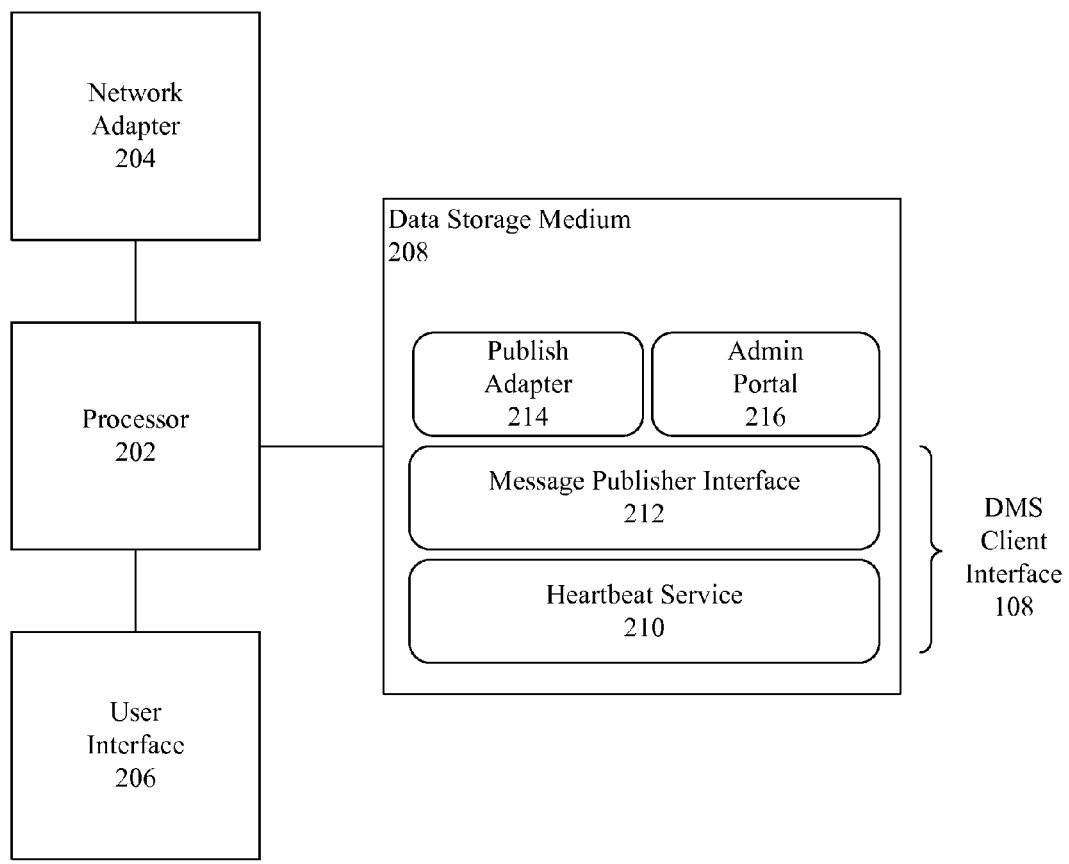
FIG. 2 depicts a block diagram of a DMS server that is useful for understanding the present description.

FIG. 2 depicts a block diagram of a DMS Server 102 that is useful for understanding the present description. The DMS Server 102 can include a processor 202, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The DMS Server 102 also can include a network adapter 204 communicatively linked to the processor 202. The network adapter 204 can communicatively link the DMS server 102 to the fielded device 104 via the communication network 106. As such, the network adapter 204 can be configured to TCP/IP or any other suitable communication protocol. In another arrangement, the network adapter 204 can include a transceiver that implements wireless communications using a suitable wireless communication protocol. Examples of such communication protocols include, but are not limited to, IEEE 802 wireless communications (e.g., 802.11 (WiFi™) and 802.16 (WiMAX), WPA, or WPA2), TDMA, CDMA, WCDMA, GSM, UMTS, GPRS, EUTRAN, UMB, OFDM, LTE, direct wireless communication, etc. Still, the network adapter 204 can communicate with the fielded device 104 using any other suitable communication protocol(s) and the present arrangements are not limited in this regard.

Optionally, the DMS Server 102 further can include a user interface 206 communicatively linked to the processor 202. The user interface 206 can comprise one or more tactile input devices (e.g., a keyboard), a pointing device (e.g., a mouse), a display, and/or any other devices via which a user can interface with the DMS server 102. Of course, the user interface 206 also can include additional processors, controllers and the like that communicatively link user interface devices to the processor 202, as well known to the skilled artisan. In lieu of user interface devices, a user may interface with the DMS server 102 via an administration portal, which will be described herein.

The DMS Server 102 also can include a computer-readable data storage medium (hereinafter "data storage medium") 208 communicatively linked to the processor 202. The data storage medium 208 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage medium 208 can be integrated into the processor 202, though this need not be the case.

The data storage medium 208 can store the DMS client interface 108. The DMS client interface 108 can be implemented as computer-readable program code that, when executed by the processor 202, implements the various DMS client interface processes described herein. As noted, the DMS client interface 108 can include a heartbeat service 210 and a message publisher interface 212. The heartbeat service 210 can communicate heartbeat requests to fielded devices 104 and receive heartbeats from the fielded devices 104 in response to the heartbeat requests. The heartbeat service 210 also can initiate communication of DMS directives to the fielded devices 104 in response to heartbeats 120 that are received. For example, the heartbeat service 210 can indicate to the message publisher interface 212 that a fielded device 104 is available to receive updates. In response, the message publisher interface 212 can initiate communication of one or more corresponding DMS directives 110 to the fielded device 104.

The data storage medium 208 can store a publish adapter 214 and an administration portal 216. These components can be implemented as computer-readable program code that, when executed by the processor 202, implements the various processes described herein, respectively. The publish adapter 214 can support communication protocols used by the message publisher interface 212 to communicate with fielded devices 104. Examples of publish adapters 214 include SOAP and REST application program interfaces (APIs), but the present arrangements are not limited to these examples. The administration portal 216 can be a portal via which a user may interact with the DMS server 102, for example to configure the DMS server 102, configure updates (e.g., DMS directives), etc. Administration portals are well known to the skilled artisan.

Figure 3:
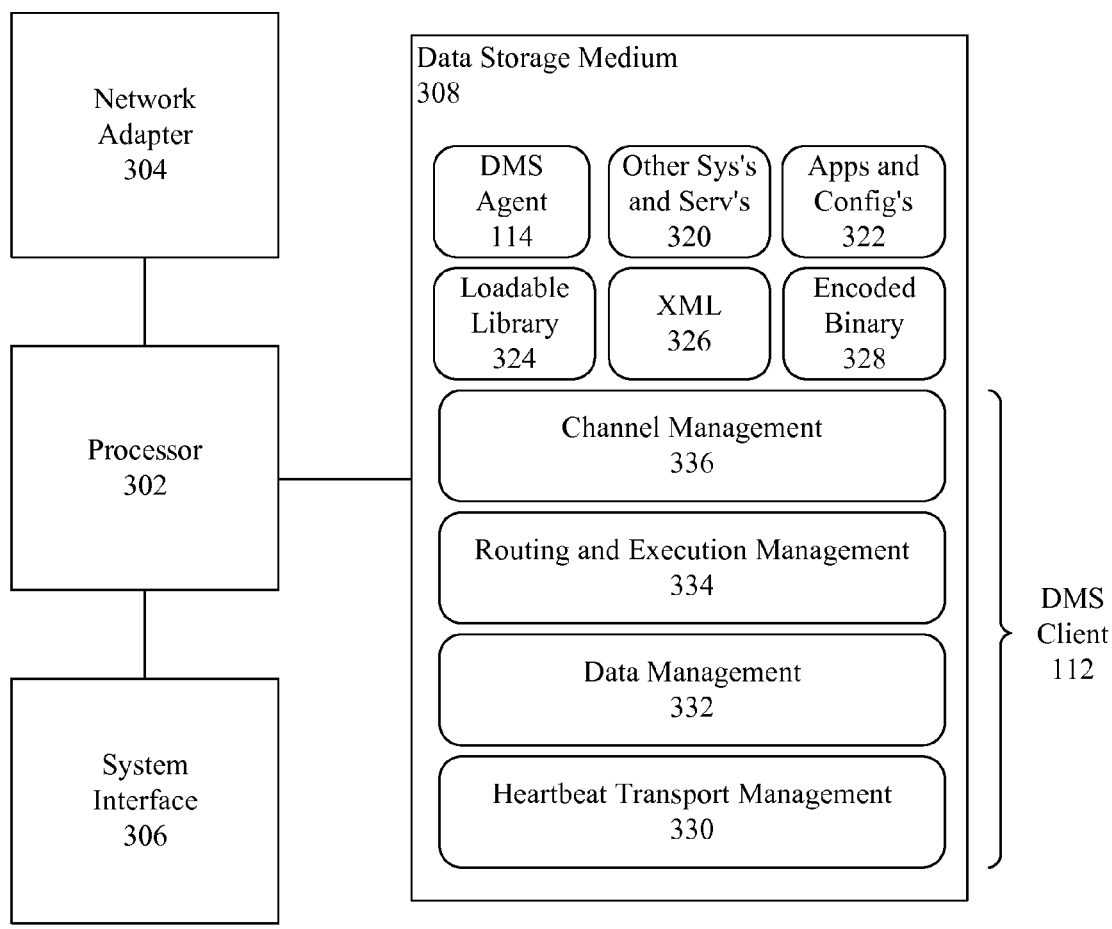
FIG. 3 depicts a block diagram of a fielded device that is useful for understanding the present description.

FIG. 3 depicts a block diagram of a fielded device 104 that is useful for understanding the present description. The fielded device 104 can include a processor 302, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The fielded device 104 also can include a network adapter 304 communicatively linked to the processor 302. The network adapter 304 can communicatively link the fielded device 104 to the DMS server 102 via the communication network 106. As such, the network adapter 304 can be configured to TCP/IP or any other suitable communication protocol. In another arrangement, the network adapter 304 can include a transceiver that implements wireless communications using a suitable wireless communication protocol. Examples of such communication protocols include, but are not limited to, IEEE 802 wireless communications (e.g., 802.11 and 802.16 (WiMax), WPA, or WPA2), TDMA, CDMA, WCDMA, GSM, UMTS, GPRS, EUTRAN, UMB, OFDM, LTE, direct wireless communication, etc. Still, the network adapter 304 can communicate with the DMS server 102 using any other suitable communication protocol(s) and the present arrangements are not limited in this regard.

The fielded device 104 further can include a system interface 306 communicatively linked to the processor 302, which enables the processor 302 of the fielded device 104 to communicate with another system, for example, a system in which the fielded device 104 is embedded. In this regard, the system interface 306 can include a system bus, one or more controllers, one or more communication ports, or any other devices via which the processor 302 can communicate with the system. In this regard, the processor 302 can be configured to control functionality of various aspects of the system in which the fielded device 104 is embedded.

The fielded device 104 also can include a computer-readable data storage medium (hereinafter "data storage medium") 308 communicatively linked to the processor 302. The data storage medium 308 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage medium 308 can be integrated into the processor 302, though this need not be the case.

The data storage medium 308 can store the DMS agent 114, other systems and services 320, applications and configuration files 322, loadable library files 324 (e.g., vocabulary dictionaries), XML documents 326, and encoded binary data 328. As noted, the loadable library files 324, XML documents 326, and encoded binary data 328 can be processed by the DMS agent 114 to implement commands contained in DMS directives 110, as previously described. The DMS agent 114 also can interact with the other systems and services 320, and the applications and configuration files 322, as needed to implement such commands. For example, the DMS agent 114 can update other systems and services 320, and the applications and configuration files 322. The DMS agent 114 also can utilize the systems and services 320, and the applications and configuration files 322, as needed to implement the commands.

The DMS client 112 also can be stored on the data storage medium 308 or otherwise made accessible to the processor 302. The DMS client 112 can include a heartbeat transport management application 330, a data management application 332, a routing and execution management application 334 and a channel management application 336. The DMS client 112 also can include other software and the present arrangements are not limited in this regard.

The heartbeat transport management application 330 can be executed by the processor 302 to receive heartbeat responses from the DMS server 102, communicate heartbeats 120 to the DMS server 102, and the like. The data management application 332 can include a data stream interpreter and/or a vocabulary management software. The data stream interpreter can interpret data streams received by the fielded device 104 so that such data streams may be implemented by the fielded device 104. For example, the data stream interpreter can parse data from communication messages, such as commands contained in DMS directives 110, so that the data may be suitably processed by the fielded device 104. The vocabulary management software can manage vocabulary dictionaries contained within DMS directives 110 as intelligence information. In illustration, the vocabulary management software can parse vocabulary libraries from messages and collect the data into files.

The routing and execution management application 334 can route data parsed from communication messages to appropriate applications/services on the fielded device 104 for which the data is intended. For example, the routing and execution management application 334 can route commands contained in DMS directives 110 to the DMS agent 114. Such commands can be, for instance, non-persistent system level commands. The routing and execution management application 334 also disseminate loadable libraries 324, XML documents 326, encoded binary data 328, etc. so as to be available for processing on the fielded device 104. For instance, the loadable libraries 324, XML documents 326, encoded binary data 328, etc. can be formatted and stored as persistent data that is made available to the DMS agent 114, other systems and services 320 and/or applications 322.

The channel management application 336 can manage communications transmitted by, or received by, the network adapter 304. Together, the heartbeat transport management application 330, data management application 332, routing and execution management application 334 and channel management application 336 can comprise the DMS client 112.

Figure 4:
FIG. 4 is a flowchart presenting a method of remotely managing a fielded device with a DMS that is useful for understanding the present description

FIG. 4 is a flowchart presenting a method 400 of remotely managing a fielded device with a DMS that is useful for understanding the present description. The method 400 depicted may be applicable to the embodiments described above in relation to FIGS. 1-3, but it is understood that the method 400 can be carried out with other suitable systems and arrangements. Moreover, the method 400 may include other steps that are not shown here, and in fact, the method 400 is not limited to including every step shown in FIG. 4. The steps that are illustrated here as part of the method 400 are not limited to this particular chronological order, either.

At step 402, a DMS directive for a fielded device can be generated. The DMS directive can comprise at least one system command for a DMS agent instantiated on the fielded device and intelligence information not previously stored on the fielded device that is necessary for the DMS agent to interpret the system command. At step 404, the DMS directive can be communicated to the fielded device.

FIG. 5 is a flowchart presenting another method 500 of remotely managing a fielded device with a DMS that is useful for understanding the present description. The method 500 depicted may be applicable to the embodiments described above in relation to FIGS. 1-3, but it is understood that the method 500 can be carried out with other suitable systems and arrangements. Moreover, the method 500 may include other steps that are not shown here, and in fact, the method 500 is not limited to including every step shown in FIG. 5. The steps that are illustrated here as part of the method 500 are not limited to this particular chronological order, either.

At step 502, a DMS directive can be received on a fielded device. The DMS directive can comprise at least one system command for a DMS agent instantiated on the fielded device and intelligence information not previously stored on the fielded device that is necessary for the DMS agent to interpret the system command.

At step 504, the DMS agent can be executed to process the system command using the intelligence information provided in the DMS directive to implement the system command without requiring an update to computer-readable program code that defines the DMS agent.

Referring to decision box 506, if the intelligence information is not persistent data, at step 508 the intelligence information can be deleted from the fielded device. If the data is persistent data, the intelligence information need not be deleted. The process can end at step 510.

The term "persistent data" is defined as data that a fielded device may process at a later time to implement future commands received in DMS directives, or process for any other purpose. The term "non-persistent data" is defined as data for which it is not desirable to maintain on the fielded device after the commands in the DMS directive have been processed. For example, if the intelligence information comprises a daemon, it may not be desirable to maintain the daemon on the fielded device if to do so may create a security risk.

The flowcharts and block diagrams in the figures illustrate the architecture, functionality, and operation of possible implementations of systems, methods and computer program products according to various embodiments. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable or computer-readable program code that, when being loaded and executed, controls the processing system such that it carries out the methods described herein. The systems, components and/or processes also can be embedded in a computer-readable storage medium, such as a computer-readable storage medium of a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

The present arrangements can be embodied in other forms without departing from the spirit or essential attributes thereof. Accordingly, reference should be made to the following claims, rather than to the foregoing specification, as indicating the scope of the invention.

What is claimed is:

1. A method of remotely managing a fielded device with a device management system (DMS), comprising:
   via a processor, receiving a DMS directive on the fielded device, the DMS directive comprising at least one system command for a DMS agent instantiated on the fielded device and intelligence information not previously stored on the fielded device that is necessary for the DMS agent to interpret the system command; and
   via the processor, executing the DMS agent to process the system command using the intelligence information provided in the DMS directive to implement the system command without requiring an update to computer-readable program code that defines the DMS agent.

2. The method of claim 1, wherein the intelligence information comprises a loadable library.

3. The method of claim 1, wherein the intelligence information comprises an extensible markup language (XML) document.

4. The method of claim 1, wherein the intelligence information comprises encoded binary data.

5. The method of claim 1, wherein the intelligence information comprises a daemon that is instantiated on the fielded device when the DMS agent is executed to process the system command.

6. The method of claim 1, wherein the intelligence information is received by the fielded device as a payload contained in a message in which the DMS directive is communicated.

7. The method of claim 1, further comprising deleting from the fielded device the intelligence information after processing of the system command is completed.

8. A method of remotely managing a fielded device with a device management system (DMS), comprising:
   via a processor, generating a DMS directive for the fielded device, the DMS directive comprising at least one system command for a DMS agent instantiated on the fielded device and intelligence information not previously stored on the fielded device that is necessary for the DMS agent to interpret the system command; and
   via the processor, communicating the DMS directive to the fielded device.

9. The method of claim 8, wherein the intelligence information comprises a loadable library.

10. The method of claim 8, wherein the intelligence information comprises an extensible markup language (XML) document.

11. The method of claim 8, wherein the intelligence information comprises encoded binary data.

12. The method of claim 8, wherein the intelligence information comprises a daemon to be instantiated on the fielded device when the DMS agent is executed to process the system command.

13. The method of claim 8, wherein the intelligence information is received by the fielded device as a payload contained in a message in which the DMS directive is communicated.

14. The method of claim 8, wherein the system command comprises an instruction to delete from the fielded device the intelligence information after processing of the system command is completed.

15. A fielded device remotely managed by a device management system (DMS), comprising:
   a processor configured to:
   receive a DMS directive on the fielded device, the DMS directive comprising at least one system command for a DMS agent instantiated on the fielded device and intelligence information not previously stored on the fielded device that is necessary for the DMS agent to interpret the system command; and
   execute the DMS agent to process the system command using the intelligence information provided in the DMS directive to implement the system command without requiring an update to computer-readable program code that defines the DMS agent.

16. The fielded device of claim 15, wherein the intelligence information comprises at least one of a loadable library, an extensible markup language (XML) document or encoded binary data.

17. The fielded device of claim 15, wherein the intelligence information comprises a daemon that is instantiated on the fielded device when the DMS agent is executed to process the system command.

18. The fielded device of claim 15, wherein the intelligence information is communicated as a payload contained in a message in which the DMS directive is communicated.

19. The fielded device of claim 15, wherein the processor deletes from the fielded device the intelligence information after processing of the system command is completed.

20. A device management system (DMS) server that remotely manages a fielded device, comprising:
   a processor configured to:
      generate a DMS directive for the fielded device, the DMS directive comprising at least one system command for a DMS agent instantiated on the fielded device and intelligence information not previously stored on the fielded device that is necessary for the DMS agent to interpret the system command; and
      communicate the DMS directive to the fielded device.

21. The DMS server of claim 20, wherein the intelligence information comprises at least one of a loadable library, an extensible markup language (XML) document or encoded binary data.

22. The DMS server of claim 20, wherein the intelligence information comprises a daemon to be instantiated on the fielded device when the DMS agent is executed to process the system command.

23. The DMS server of claim 20, wherein the DMS server communicates the intelligence information as a payload contained in a message in which the DMS directive is communicated.

24. The DMS server of claim 20, wherein the system command comprises an instruction to delete from the fielded device the intelligence information after processing of the system command is completed.

* * * * *